United States Patent [19]
Shaw

[11] Patent Number: 5,467,904
[45] Date of Patent: Nov. 21, 1995

[54] REINFORCED CERAMIC TUBE

[76] Inventor: Richard D. Shaw, "Dunedin", High Elms Road, Down, Orpinton, Kent BR6 7JN, United Kingdom

[21] Appl. No.: 140,482

[22] Filed: Oct. 25, 1993

[30] Foreign Application Priority Data

Oct. 26, 1992 [GB] United Kingdom ............... 9222453

[51] Int. Cl.⁶ .................................................. B22D 41/58
[52] U.S. Cl. ........................................ 222/603; 222/606
[58] Field of Search .................................. 222/603, 606, 222/607; 266/285, 225

[56] References Cited

U.S. PATENT DOCUMENTS

| | | | |
|---|---|---|---|
| 4,023,782 | 5/1977 | Eifer | 266/285 |
| 4,367,868 | 1/1983 | Blom et al. | 266/225 |
| 4,792,070 | 12/1988 | Daussan et al. | 222/606 |
| 5,100,035 | 3/1992 | Dunworth et al. | 222/603 |

*Primary Examiner*—Scott Kastler
*Attorney, Agent, or Firm*—Cushman Darby & Cushman

[57] ABSTRACT

A reinforced ceramic tube for refractory use comprises a settable slurry cast inside a metal sleeve with longitudinal, compliance. In use the sleeve moves with ceramic under thermal stress to avoid major cracking.

7 Claims, 2 Drawing Sheets

REINFORCED CERAMIC TUBE

FIELD OF THE INVENTION

This invention relates to a reinforced ceramic tube for use in a thermally severe environment, for example, in and around furnaces and molten metal.

BACKGROUND OF THE INVENTION

A ceramic may be defined as any body of refractory oxide which is characterised favourably by hard wear and resistance to high temperature but unfavourably by relative fragility. Ceramic tubes have numerous refractory applications, exemplified by nozzles and heat exchangers as will be described hereinafter.

SUMMARY OF THE INVENTION

The object of the invention is to provide a ceramic tube reinforced in a novel manner which does not have the disadvantage of fragility and may be used in extended length.

In accordance with the present invention a reinforced tubular element for use in a thermally severe environment comprises a tube of ceramic material contained within a metallic support sleeve structured so as to be capable of longitudinal movement (other than by its inherent thermal expansion) whilst remaining radially stable. The ceramic material will usually be cast from a slurry within the reinforcing sleeve so that the sleeve and ceramic are keyed and move together with expansion and contraction.

With such an arrangement the support sleeve can make longitudinal movements to accommodate expansion and contraction of the ceramic to prevent disintegration and collapse of the latter. The metal support sleeve is substantially radially stable to maintain effective reinforcement. Small cracks may develop in the ceramic in use but, as explained hereinafter, these can be advantageous.

The support member may conveniently be formed of stainless steel which has the necessary properties and is formed into a structure or configuration so as to have the required compliance i.e. so as to be capable of limited longitudinal non-transporting movements whilst remaining in its overall tubular supporting configuration. A preferred support sleeve is a tube of relatively thin steel sheet with circumferential lateral pleats or folds of the type used, for example, as flue liners. Such a sleeve is maybe formed from the tubular sheet material sold under the Registered Trade Mark KOPEX. In the KOPEX tube the lateral pleats are formed by a shallow continuous helical groove. This tube is capable of longitudinal expansion and contraction concertina-fashion about its multiple fold lines. Another possibility is a cellular type construction or a netting.

The steel support sleeve or pipe acts as a reinforcement to the ceramic so that thermal cracks in the ceramic are contained rather than allowed to develop to collapse the tube. The concertina formation allows longitudinal expansion and contraction and does not in itself apply stress. Nevertheless the radial dimensions remain essentially constant so the ceramic material is under the necessary radial compression.

The invention finds particular application in that device which guides and protects the flow of molten steel from a tundish to a continuous casting mould.

The lower end of the device, in use, is below the surface of the molten steel and the device is thus known as a submerged entry nozzle.

A submerged entry nozzle in use is subject to severe thermal and chemical attack. The temperature of the molten steel may well be in excess of 1500° C., so a very large temperature gradient exists from the inner wall of the tube contacting the steel to the exposed external wall. Additionally the lower end of the tube is completely immersed in molten steel. It will moreover, be appreciated that, on first pouring and entry into the mould, a major thermal shock occurs. From the chemical point of view the surfaces of the tube contacting the steel must be resistant to erosion and corrosion at the temperatures of the molten steel and furthermore the interface between the molten steel and the air above the mould contains a variety of fluxes to prevent contamination by air and these fluxes are highly corrosive to ceramics.

Fused silica is a suitable ceramic material so far as resistance to thermal shock and the other physical properties is concerned but is liable to chemical attack from certain of the ingredients used in modern molten steel manufacturing, for example manganese. A further widely used material is a mixture of alumina and graphite which is subject to rapid oxidation if not properly protected by a glaze thus, although having good thermal shock properties, is not particularly resistant to chemical attack.

According to a more specific aspect of the present invention a submerged entry nozzle, or other element having a similar use comprises a tube of ceramic material resistant to chemical attack as set out above, said tube being contained within a longitudinally compliant metallic support sleeve which allows the ceramic material to expand and crack without collapse, said support having thermal and physical properties appropriate to the working environment.

Different ceramic materials may be cast along the length of the tube depending on physical and chemical requirements, and indexed a part of the tube can be removed or repaired. It will be appreciated that the part of the tube that is immersed is subject to much greater wear and if replaceable the length of life of the component will be substantially increased with consequent economic advantage. The ceramic material for a submerged entry nozzle may be a cast magnesium aluminium spinel produced as described in my E.P.A. 0,351,084 or E.P.A. 0,501,662. However, the invention is in principle applicable to all ceramics fired or unfired which combine the advantages of heat resistance and wear with the disadvantage of a relative physical fragility. Thus the invention may be applied to simple fired clays and fired cast hydraulic cements and fired green shapes from chemically set systems (see my European Applications referred to above). Materials such as Bauxites, Magnesites, Aluminas, Calcined Clays, Kyanites, Carbides etc. are also envisaged.

Another application of the invention is to a heat exchange tube through which gas from a furnace may flow.

The support sleeve in accordance with the invention can be contained within an outer tubular support according to structural requirements and application.

BRIEF DESCRIPTION OF THE DRAWINGS

The invention and further advantages thereof will be described with reference to the accompanying diagrammatic drawings wherein.

DETAILED DESCRIPTION OF PREFERRED EXEMPLARY EMBODIMENT

Figure 1:
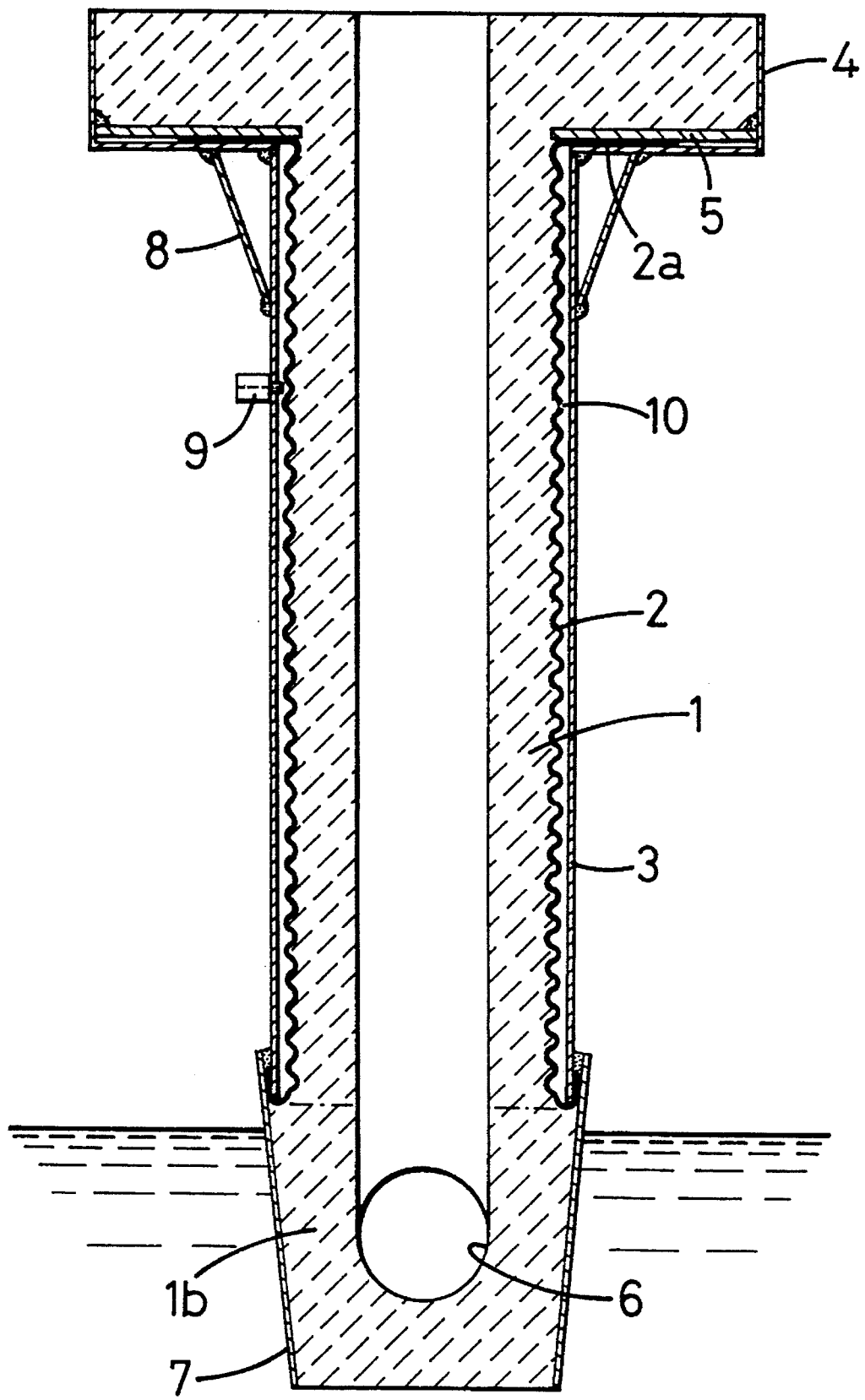
FIG. 1 is a diagrammatic sectional view of a submerged entry nozzle in accordance with the invention.

The nozzle essentially comprises an elongate cylindrical ceramic tube 1 depending from a square upper part. Both the tube 1 and the upper part are formed of magnesium aluminium spinel cast within a cylindrical KOPEX stainless steel pipe 2 with lateral folds or pleats, and an upper square section steel can 4. The KOPEX pipe 2 is contained within an outer cylindrical steel tube 3 welded to the bottom of can 4. A reinforcing cone 8 surrounds and is fixed to the tube 3 and the underside of the can. The upper end of the KOPEX pipe 2 is folded outwardly to form a part 2a which is clamped to the base of the can 4 by an apertured steel plate 5 fixed by welding and the lower part is folded round the lower end of tube 3 and set in the ceramic 1. The bottom part 1b of the tube 1, which may be a replacable end piece has two laterally emerging nozzles 6 spaced by 180°. In the embodiment being described the bottom part 1b extends beyond the KOPEX tube 2 and is is contained within a spun apertured conical metal end piece 7 welded to the lower end of outer tube 3.

If desired various parts of the ceramic tube may be cast in different spinel compositions in accordance with physical and chemical requirements.

In accordance with a further feature of the invention a lateral gas injection facility is is provided. This is diagrammatically indicated as nozzle 9 which communicates with the space between inner surface of tube 3 and the outer surface of tube 2. The KOPEX tube is apertured at 10 to allow the gas to enter the ceramic tube 1. The gas fills any cracks in the tube and thus protects the molten steel in the ceramic tube 1 from atmospheric contamination by oxygen and nitrogen. The ceramic is also cooled by the gas so that any steel entering a crack will be "frozen" to render the tube to some extent self-repairing. The facility of nozzle 9 can also be used to inject argon into the molten steel if this is desired.

In use molten metal from the tundish flows through tube 1 into a casting mould the lower end part of the nozzle being immersed in molten metal.

The nozzle shown and described is based on but one proprietary version. Numerous constructional alternatives are possible. For example the outer sleeve 3 may be omitted as maybe unreinforced bottom part 1b. The nozzles 6 will then be within the reinforced tube which will then have corresponding apertures.

Figure 2:
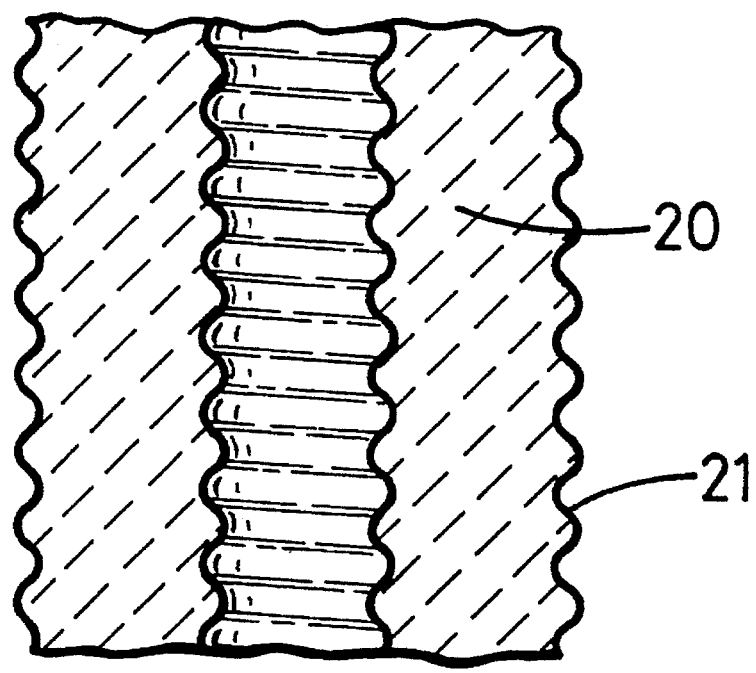
FIG. 2 is a section through a length of a heat exchange tubing.

FIG. 2 of the accompanying drawings shows a length of heat exchanger or recuperator tubing in accordance with the invention. As illustrated the tube simply comprises ceramic 20 cast within an outer sleeve of KOPEX tubing 21. If desired for this and indeed other applications the ceramic tube may have, as illustrated, an inner KOPEX lining 22 in addition to an outer sleeve. Hot furnace gases, for example, flow through a number of these tubes whilst gas to be heated flows over the tubes.

Figure 3:
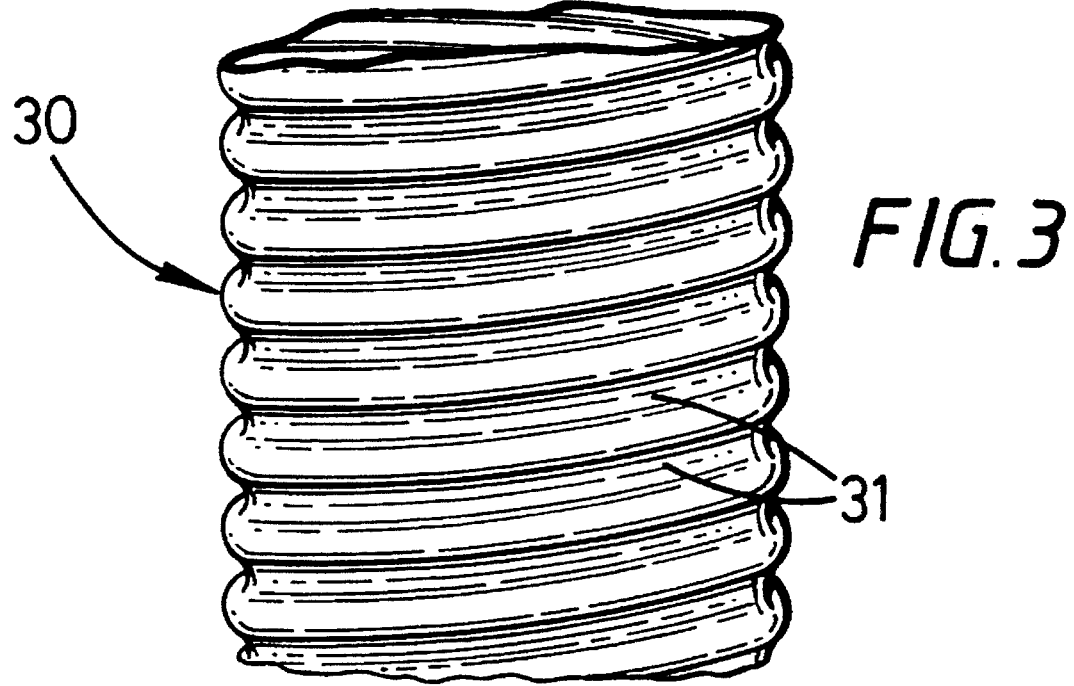
FIG. 3 is a piece of KOPEX pipe.

FIG. 3 shows a length of KOPEX stainless steel tubing. The tube 30 formed of thin stainless steel is self-supporting when stood with its long axis upright. A continuous groove 31 of part circular cross-section advances as a continuous helix to define the folds which provide the longitudinal compliance in accordance with the invention. The helix is shallow so that the grooves/folds are substantially lateral to fold and provide the longitudinal compliance.

A reinforced tube in accordance with the present invention may be made by moulding or casting. Conveniently a settable slurry is poured directly into the KOPEX sleeve with a suitable axially extending former to define an annular space. The slurry sets and is keyed to the KOPEX sleeve by virtue of the folds or corrugations of the latter. The set tube may then be fired to form to form the ceramic as a separate operation or in situ.

I claim:

1. A refractory article comprising an elongated tube of ceramic material, said tube having an outer surface, a metallic support sleeve having an interior surface directly connected to said outer surface along at least a portion of a length of said tube, the ceramic tube and the metallic support sleeve being keyed to one another to expand and contract together so that radial stability and structural integrity of said tube are maintained by said metallic support sleeve, and a tubular sleeve member positioned about and spaced from said metallic support sleeve, said metallic support sleeve being provided with at least one aperture, a gas inlet nozzle secured within said tubular sleeve so that gas entering through said nozzle flows into the space about said metallic support sleeve and into said at least one aperture so as to enter and fill cracks formed in the ceramic tube .

2. A refractory article according to claim 1 wherein said metallic support sleeve comprises a sleeve of steel sheet with a plurality of circumferential pleats.

3. A refractory article according to claim 1 wherein the ceramic material is a basic material based on alumina or an alumina magnesia spinel resistant to chemical attack and thermal shock.

4. A refractory article according to any of claims 1, 2 or 3 wherein said ceramic tube further includes an extension at one end and a submerged entry nozzle at said one end.

5. A refractory article as in claim 1 wherein said metallic support sleeve is stainless steel.

6. A refractory article as in claim 1 wherein said ceramic tube is cast within said metallic support sleeve.

7. A refractory article as in claim 1 wherein said metallic support sleeve provides radial compression to said ceramic material.

\* \* \* \* \*